(12) United States Patent
Kindl (10) Patent No.: US 9,242,802 B2
(45) Date of Patent: Jan. 26, 2016

(54) APPARATUS FOR THE CONVEYING OF PLASTICS MATERIAL PRE-FORMS WITH CONTINUOUS FEED

(71) Applicant: KRONES AG, Neutraubling (DE)

(72) Inventor: Norbert Kindl, Tegernheim (DE)

(73) Assignee: Krones, AG, Neutraubling (DE)

( * ) Notice: Subject to any disclaimer, the term of this patent is extended or adjusted under 35 U.S.C. 154(b) by 0 days.

(21) Appl. No.: 14/215,539

(22) Filed: Mar. 17, 2014

(65) Prior Publication Data

US 2014/0284181 A1 Sep. 25, 2014

(30) Foreign Application Priority Data

Mar. 21, 2013 (DE) .......................... 10 2013 102 878

(51) Int. Cl.
| | |
|---|---|
| *B65G 19/02* | (2006.01) |
| *B65G 47/28* | (2006.01) |
| *B65G 47/26* | (2006.01) |
| *B65G 47/08* | (2006.01) |
| *B65G 47/84* | (2006.01) |

(52) U.S. Cl.
CPC .............. *B65G 19/02* (2013.01); *B65G 47/082* (2013.01); *B65G 47/28* (2013.01); *B65G 47/845* (2013.01)

(58) Field of Classification Search
None
See application file for complete search history.

(56) References Cited

U.S. PATENT DOCUMENTS

| | | | | |
|---|---|---|---|---|
| 4,533,038 A | * | 8/1985 | Richard ................ | B65G 17/12 198/803.15 |
| 4,637,509 A | | 1/1987 | Raudat et al. | |
| 5,501,552 A | * | 3/1996 | Simkowski .......... | B65G 51/035 198/450 |
| 2013/0192956 A1 | * | 8/2013 | Lahogue ............... | B65G 17/32 198/478.1 |

FOREIGN PATENT DOCUMENTS

| | | |
|---|---|---|
| DE | 3702954 | 8/1988 |
| DE | 3920291 | 1/1991 |
| DE | 4036341 | 5/1992 |
| DE | 2011014495 | 9/2012 |
| EP | 0447123 | 9/1991 |
| EP | 1247769 | 10/2002 |
| FR | 2491039 | 4/1982 |
| FR | 2563184 | 10/1985 |

OTHER PUBLICATIONS

Search Report dated Oct. 12, 2013. issued in corresponding German Patent Application No. 102013102878.0.

* cited by examiner

*Primary Examiner* — Kavel Singh
(74) *Attorney, Agent, or Firm* — Onello & Mello LLP (57) ABSTRACT

Provided is an apparatus that conveys container pre-forms comprising a first circulating carrier and a plurality of engagement devices constructed and arranged on the first circulating carrier. The engagement devices circulate along a pre-set circulation path during a movement of the first circulating carrier. The circulation path has at least one portion at which the engagement devices are fed during the movement along the circulation path onto a flow of the containers. The engagement devices are shaped such that during the feed onto the flow of the containers each engagement device applies a force between two adjacent containers and forces the two containers apart from each other.

22 Claims, 4 Drawing Sheets

APPARATUS FOR THE CONVEYING OF PLASTICS MATERIAL PRE-FORMS WITH CONTINUOUS FEED

BACKGROUND

1. Field

The present invention relates to an apparatus and a method for the conveying of containers, in particular of plastics material containers and in particular of plastics material pre-forms.

2. Description of Related Art

In the production of beverage containers, it is typical for plastics material pre-forms to be heated, and shaped while in a heated state in a shaping machine, such as a stretch blow moulding machine. The plastics material pre-forms are usually separated from each other when fed to a heating device, such as an infrared or microwave furnace. Here, the pre-forms are rotated about their own axis during their heating. For this reason, it is necessary for the plastics material pre-forms, which usually arrive in a continuous flow, to be separated.

So-called single-step star wheels are commonly used in the prior art as part of a separation operation of the pre-forms. The wheels typically have a serrated profile on their external periphery. This profile has an effect whereby the plastics material pre-forms, which arrive in a continuous flow, are removed piece by piece and are thereby separated. A drawback of this procedure is the constantly interrupted inflow of the pre-forms from an outflow rail during the shearing into the aforesaid serrated star wheel. This disruption to the inflow causes operational breakdowns at high power and also in the case of infelicitous geometry of the plastics material pre-forms.

SUMMARY

The object of the present invention is therefore to simplify the separation of these plastics material containers and, in particular, to make them less susceptible to breakdown. This is attained according to the inventive concepts as claimed.

In one aspect, provided is an apparatus that conveys container pre-forms, comprising: a first circulating carrier; and a plurality of engagement devices constructed and arranged on the first circulating carrier. The engagement devices circulate along a pre-set circulation path during a movement of the first circulating carrier. The circulation path has at least one portion at which the engagement devices are fed during the movement along the circulation path onto a flow of the containers. The engagement devices are shaped such that during the feed onto the flow of the containers each engagement device applies a force between two adjacent containers and forces the two containers apart from each other.

In some embodiments, the circulation path has at least two portions, each portion having a different curvature.

In some embodiments, the carrier is a circulating carrier having at least a flexible portion.

In some embodiments, the engagement devices are constructed and arranged to pivot with respect to the first circulating carrier.

In some embodiments, a geometrical position of at least one portion of the circulation path of the engagement devices changes with respect to the flow of the containers.

In some embodiments, the circulation path has at least one straight portion.

In some embodiments, the apparatus further comprises a feed rail which supports the containers, wherein the containers are conveyed along the feed rail.

In some embodiments, at least one engagement device has a shape having a shape that increases in a direction of extension.

In some embodiments, the apparatus has a second circulating carrier, wherein a circulation plane of the second carrier is parallel to a circulation plane of the first carrier.

In some embodiments, the engagement devices are arranged on the second circulating carrier.

In some embodiments, the container pre-forms include plastics material pre-forms.

In another aspect, provided is a method of conveying material container preforms. The method comprises conveying the material container preforms in a continuous flow; separating the material container preforms from each other by a separating device; arranging a plurality of engagement devices on a circulating carrier and feeding the engagement devices to the continuous flow of the material container preforms to separate the material container preforms, including: inserting an engagement device of the plurality of engagement devices between adjacent material container preforms and forcing the adjacent material container preforms apart.

In some embodiments, the material container pre-forms are conveyed on a straight conveying path for a predetermined time during the separation of the material container preforms.

In some embodiments, the material container pre-forms include plastics material pre-forms.

In some embodiments, the engagement devices circulate along a pre-set circulation path during a movement of the circulating carrier.

In some embodiments, the method further comprises conveying the container pre-forms along a feed rail.

In some embodiments, the engagement devices have a triangular or trapezoidal shape for insertion between adjacent container pre-forms.

In another aspect provided is an apparatus that conveys container pre-forms, comprising: a carrier; and a plurality of engagement devices constructed and arranged on the carrier, which conveys the engagement devices are conveyed along a path. The engagement devices are inserted between the pre-forms for separating the pre-forms.

In some embodiments, a geometrical position of at least one portion of the path of the engagement devices with respect to the flow of the containers is adjustable.

In some embodiments, the path is a circulation path having at least one straight portion.

DESCRIPTION OF THE DRAWINGS

The above and other aspects and features of the present inventive concept will become more apparent by describing in detail exemplary embodiments thereof with reference to the attached drawings, in which.

DETAILED DESCRIPTION

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In brief overview, embodiments of the present inventive concepts relate to an apparatus that conveys containers, and in particular, pre-forms formed of a plastics material. The apparatus has a first circulating carrier on which a plurality of engagement devices are arranged, in such a way that these engagement devices circulate along a pre-set circulation path.

According to the inventive concepts, the circulation path has a first portion at which the engagement devices are capable of being fed during the movement thereof along the circulation path onto a flow of the containers, the engagement devices being shaped in such a way that during the feed onto the flow of the plastics material containers they enter between two plastics material containers and force the two plastics material containers apart as a result.

In contrast to the prior art, in which plastics material containers are entrained individually in each case or the foremost plastics material pre-form standing in line in each case is entrained, embodiments of the present inventive concepts provide the aforesaid engagement devices for engaging in each case in the regions between two (round) plastics material pre-forms and, in this way, should force the plastics material pre-forms apart and thus separate them. It is preferable for the apparatus be constructed and arranged in such a way that in a supplied state the engagement devices rest at least in part between two plastics material pre-forms. It is preferable for the engagement devices be capable of being introduced between the aperture regions of the individual pre-forms. It is possible, however, for the engagement devices to be positioned, i.e., pressed below the carrier ring, i.e. in the body region of the pre-forms.

In the case of a further advantageous embodiment, the circulation path is parallel the conveying path. It is advantageous for the circulation path of the engagement devices to extend parallel to the conveying path of the plastics material pre-forms at least in part. It is particularly preferred for the circulation path of the engagement devices to extend in a straight line at least in part.

It is advantageous for two adjacent plastics material pre-forms to be forced apart in each case during a feed operation of the engagement devices. In a further advantageous embodiment, the circulation path has at least two portions, each of a different curvature or curvature radii. In the case of a conventional serrated apparatus, the circulation paths are circular in each case. In some embodiments, the circulation path has different segments with different curvatures. In this way, for example, it is possible for portions extending in a straight line, portions extending obliquely with respect to these portions extending in a straight line, portions extending in a curve and the like to be present.

It is advantageous for the circulation path to have a first portion extending in a straight line and a second portion in a straight line but which extends obliquely with respect to the first portion extending in a straight line. In this way, the engagement devices can be brought up to the flow of the plastics material containers by way of an aforesaid portion extending obliquely. The containers can be conveyed separately in the region of the second portion extending in a straight line.

In a further advantageous embodiment, the first carrier is a circulating carrier which is flexible at least in part, in particular, in the plane of the circulation path. In this way, the carrier can be for example a belt which is preferably guided around a plurality of toothed wheels or the like. Instead of a belt, other embodiments can include a circulating chain, the flexibility of which is present in particular in the plane of the circulation path. In this way, the engagement devices can be guided with different patterns of curvature along partial stretches.

It is advantageous for the engagement devices or the engagement devices respectively to be arranged on these conveying belts or on this conveying chain.

In a further advantageous embodiment the engagement devices are arranged to pivot with respect to the carrier. The engagement devices can be pivotable in particular about an axis which is at a right angle to the circulation path of the engagement devices.

In this way, it is preferable for the engagement devices also to be pivotable in the plane formed by the circulation path and, in this way, in a particularly preferred manner also pivotable in a plane to which a longitudinal direction of the plastics material containers to be conveyed is at a right angle.

It is preferable for the engagement devices to be articulated to the first conveying device, for example, a chain or a belt.

In a further advantageous embodiment, the geometrical position of at least one portion of the circulation path of the engagement devices with respect to the flow of the containers can be changed. As a result of this change, it is preferable for the depth of penetration of the engagement devices into the flow of the containers to be capable of being changed. In this way, a desired division between the plastics material containers is capable of being set.

In a further advantageous embodiment, the circulation path of the engagement devices has at least one straight portion. In particular, this is a portion within which the engagement devices are in contact during the working operation with the plastics material pre-forms to be conveyed.

In a further advantageous embodiment, the apparatus has a feed rail which supports the containers along which the containers are conveyed. It is advantageous for the feed rail to be a passive conveying device, i.e., either the plastics material pre-forms are moved by being pushed by plastics material pre-forms situated further behind or, however, a movement based upon gravity takes place for example. In particular, the plastics material pre-forms are not yet guided separately within the feed rail, but in particular strike against one another in this case.

In the case of a further advantageous embodiment the feed rail is constructed and arranged in such a way that a main body of the plastics material pre-forms can pass through it, but not a further region of the plastics material pre-forms which is arranged, in particular, in a region of the aperture thereof. This additional region can be a so-called carrying ring or even a retaining ring which is usually present in the case of plastics material pre-forms of this type.

In the case of a further advantageous embodiment at least one engagement devices, and preferably all, the engagement devices, has a shape or other configuration which widens substantially in one direction, for example a triangular shape. On account of this triangular shape it is possible also to be able to vary—in the case of a feed of the engagement devices to a greater or lesser distance on the flow of the containers—how far the adjacent plastics material pre-forms are forced apart in each case. It is preferable for the individual engagement devices to be able to have a triangular shape at least in one portion.

It is advantageous for a drive device for driving the carrier to be present. If, as mentioned above, this is a conveying chain or a conveying belt, it is possible for a reversing wheel, by way of which this carrier is reversed, to be driven. In some embodiments, the drive device includes an electric motor drive.

In a further advantageous embodiment, the apparatus has a second circulating carrier, a circulation plane of the second carrier being arranged parallel to the circulation plane of the first carrier. It is advantageous for this second circulating carrier also to be designed in the form of a circulating chain, and in particular in the form of a circulating conveying belt. Here, the engagement devices can be arranged at least in part between these two carriers. The engagement devices can be arranged on the second carrier. The engagement devices can be arranged in a pivotable manner on the second carrier or to be articulated to the second carrier respectively.

On account of the geometrical design of the circulation path of the first carrier and of the second carrier or the respective paths, a pivoting of the engagement devices can be achieved. In this way, it is possible for a pivot axis of the engagement devices, by way of which the engagement devices is arranged on the first carrier, and a pivot axis of the engagement devices, with respect to which the engagement devices is articulated to the second carrier, to be offset with respect to each other. If the positions of the first and carriers, respectively, change with respect to each other with respect to the circulation path, it is possible, as described below, for a pivoting of the engagement devices also to be achieved in this manner. In a further advantageous embodiment, the engagement devices is produced from a plastics material.

The present invention further relates to a method of conveying plastics material containers, and in particular plastics material pre-forms. In this case the plastics material containers are conveyed in a continuous flow and are separated by a separating device. The separating device can have a plurality of engagement devices arranged on a circulating carrier, which are fed to a flow of the plastics material containers and enter between two adjacent plastics material containers in each case during this feed and, as a result, force them apart, so that a separation of the plastics material containers is achieved. The engagement devices can circulate in a plane to which the conveying path of the containers is at least parallel and, for example, with which the conveying path coincides.

It is advantageous for the plastics material containers to be conveyed on a straight conveying path at least for a time and preferably completely during their separation. In this case this conveying path preferably extends in a straight line at least in one direction or in one projection respectively. In addition, however, the conveying path can also have components in a vertical direction, so that it would be possible in particular for the plastics material containers to be supplied in part under the action of gravity. It is possible, however, for the pre-forms to be conveyed under the influence of other elements or factors, for example, compressed air.

It is advantageous for the plastics material containers to be conveyed by a movement of the engagement devices. In addition, it is advantageous for the engagement devices also be moved along a straight path at least for a time. It is preferred for the engagement devices to be moved along a straight path at least during those times during which they are in contact with plastics material containers.

In the case of a further preferred method, the plastics material containers are conveyed away with the division set by the separating device and are supplied, in particular, to a heating device for heating the plastics material containers.

Figure 1:
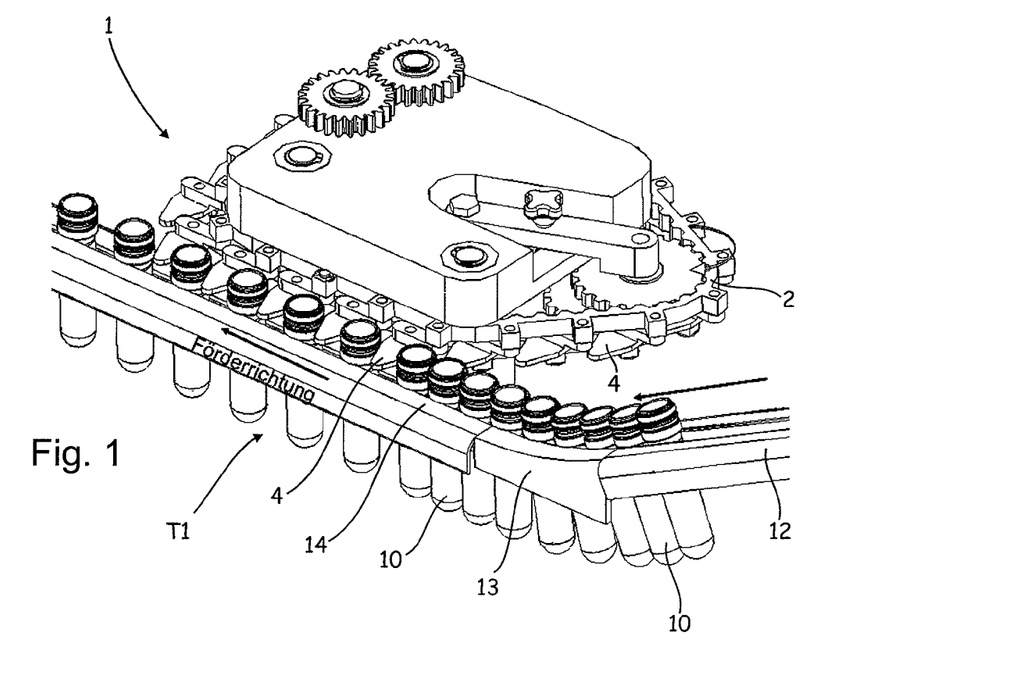
FIG. 1 is an illustration of an apparatus according to embodiments of the inventive concepts for the separation of plastics material containers.

FIG. 1 is an illustration of an apparatus 1 according to embodiments of the inventive concepts for the separation of plastics material containers. A continuous separation of plastics material pre-forms 10 to a constant division distance is preferably carried in a linear feed path T1 in the case of the apparatus according to the invention. In this way, disruptions are eliminated and at the same time high throughput rates are made possible. The plastics material pre-forms 10 are scarcely affected during a straight and steady forward movement in this case. Complicated transfers and the fittings dependent upon the plastics material pre-forms 10 are omitted. As described below, it is preferable for the plastics material pre-forms 10, whilst sliding off an inclined feed rail 12, to be received by toothed belts —guided engagement devices or separation catches respectively. In this case the engagement devices or the catches respectively move between the adjacent plastics material pre-forms 10 and thus determine a defined distance.

In FIG. 1, the feed rail 12 can be inclined and provide a means by which the plastics material pre-forms 10 are supplied under the action of gravity. Alternatively, the feed rail 12 can be arranged horizontally and provide for the conveying of the pre-forms 10 to be provided by way of additional components, for example a compressed air feed. The inclined feed rail 12 can be adjoined by a curved portion of a feed path. In this region, the individual plastics material pre-forms 10 are still conveyed in sequential order, i.e., one behind the other, and in particular, abutting against one another. The apparatus 1 has a circulating carrier 2 in the form of a conveying belt. More precisely, the conveying belt can be a toothed belt, i.e., a belt with an internal set of teeth which is driven accordingly by toothed wheels and can be also reversed.

This belt has arranged on it a plurality of engagement devices 4 which are fed to the plastics material pre-forms 10 and which slide in this way between the individual plastics material pre-forms 10, as shown in FIG. 1, and separate the latter in this way on the one hand and set them at a desired distance or a desired division respectively on the other hand. A conveying direction is likewise shown in FIG. 1. A carrier rail 14 can be included along which the plastics material pre-forms are advanced. In the region of the conveyor rail 14 the plastics material pre-forms 10 are advanced in a straight direction.

The engagement devices 4 are articulated to the carrier 2. The engagement devices 4 can have a shape, for example, a triangular, trapezoidal, wedge, or related shape, which serves as a wedge, so that, as the engagement devices enter, the respective plastics material pre-forms 10 are forced apart from one another. The engagement devices 4 engage above the carrier rail 14 of the plastics material pre-forms. It is preferable for the engagement devices always to be arranged above the carrier rail 14. It is preferable for the engagement devices to engage between threaded areas of the individual plastics material pre-forms. It is preferable for the engagement devices to be arranged equidistantly on the carrier 2. A transfer rail 13, at which the oblique course of the feed device 12 in the vertical direction is converted into the horizontal course of the carrier rail 14, can extend between the feed rail 12 and the carrier rail 14.

The feed path of the plastics material pre-forms can be straight in every case in the region in which the engagement devices 4 engage between the plastics material pre-forms. In addition, a portion is provided along which the engagement devices 4 are fed to the plastics material pre-forms. This portion is likewise shown with straight lines in the figure, but obliquely with respect to the conveying path or the feed direction respectively of the plastics material pre-forms.

It is preferable for the apparatus shown in FIG. 1 to be adjoined by a heating device for heating the plastics material pre-forms. This heating device can include a plurality of holding elements for holding the individual plastics material pre-forms. The individual holding elements are preferably arranged at a pre-set but at a constant distance from one another. The apparatus according to the inventive concepts preferably separates the plastics material pre-forms to a distance which corresponds to the distance of the holding elements of the heating device.

Figure 2:
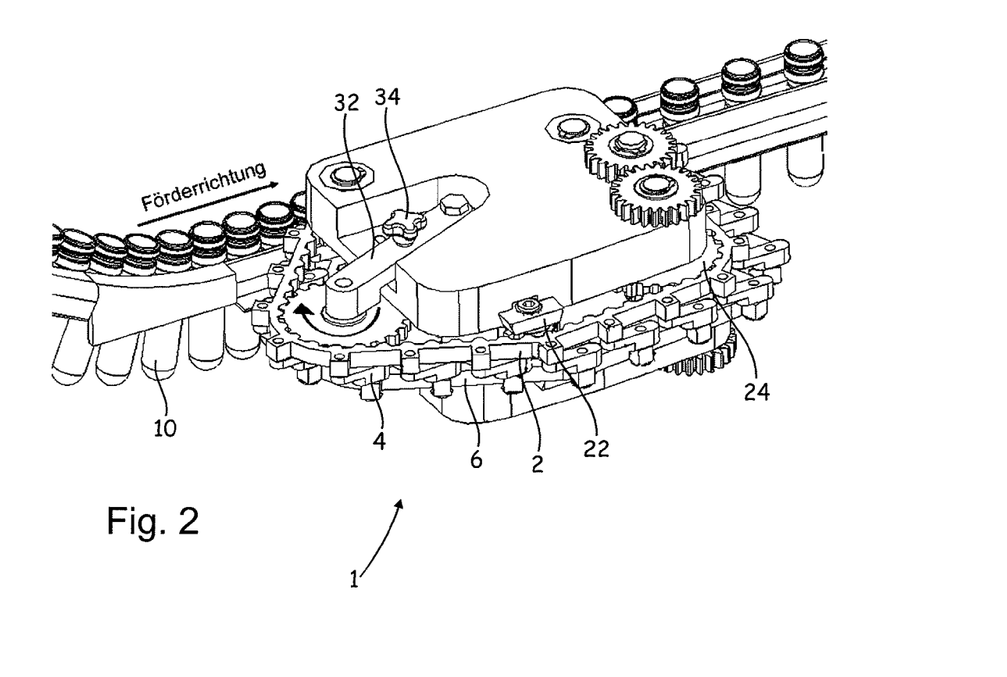
FIG. 2 is a further view of the apparatus shown in FIG. 1.

FIG. 2 shows a further configuration of an apparatus 1 according to embodiments of the inventive concepts. Here, a tensioning device 22 is shown which tensions a carrier configured in the form of a belt. This can be, for example, a toothed wheel which engages a carrier 2 on the one hand but which also tensions the carrier 2 on the other hand. A reversing wheel 24 in the form of a toothed wheel can be provided about which a belt 2 or 6 respectively is guided.

A pivotable arm 32 can change (the position of) the feed portion along which the engagement devices are fed to the plastics material pre-forms 10. More precisely, by pivoting the arm 32, for the angle at which the engagement devices are fed to the plastics material pre-forms 10 to be altered. A fixing element permits the arm 32 to be fixed in a specified position.

Figure 3:
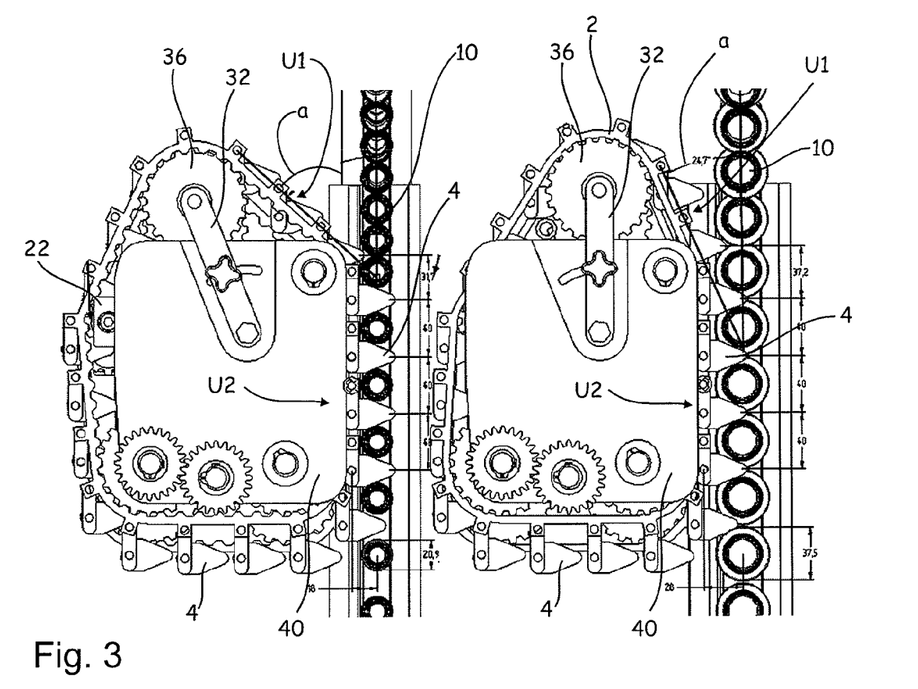
FIG. 3 are views of an apparatus that illustrates the treatment of different plastics material pre-forms according to embodiments of the inventive concepts.

FIG. 3 shows an apparatus according to the invention having different diameters of plastics material pre-forms 10. In the case of the left-hand illustration, plastics material pre-forms 10 which have a smaller cross-section than in the case of the illustration reproduced in the right-hand part of the figure are to be separated. It will be noted that the portion U1 in which the engagement devices 4 are brought to the flow of the plastics material pre-forms 10 extends in a straight line in each case. In the left-hand illustration, the feed to the plastics material pre-forms 10 with the smaller diameters. However, the feed angle is considerably larger than in the right-hand illustration, in which the plastics material pre-forms 10 with a larger cross-section are to be separated.

In general, different diameters of the plastics material pre-forms 10 can be set to a run-off rail by a variation of the feed depth of the engagement devices—wedge-shaped in this case—without additional fittings.

The different diameters of the plastics material pre-forms 10 produce different division distances when sliding on a feed rail 14. For this reason, the shear distance of the engagement devices can be adapted to the diameter of the plastics material pre-forms by a change in the feed angle by means of the above-mentioned arm 32 of the catch belt. For wide-necked plastics material pre-forms 10 with a cross-section of more than 32 mm a belt set with a division of 50 mm can be used.

FIG. 3 are views of an apparatus that illustrates the treatment of different plastics material pre-forms 10 according to embodiments of the inventive concepts.

In FIG. 3 the entire course of the engagement devices 4 is set by a course of the carrier 2. A comparison between the two parts of FIG. 3 reveals that when larger plastics material pre-forms 10 are used, the angle at which the engagement devices 4 move towards the plastics material pre-forms is significantly flatter than in the case of the left-hand embodiment described herein. This can be achieved by pivoting the arm 32 with respect to the main carrier 40.

In addition, the distance of the engagement devices 4 in the straight feed region of the plastics material pre-forms 10 from the plastics material pre-forms can be changed. It will be noted that in the left diagram of FIG. 3, the engagement devices 4 enter to a greater extent between the plastics material pre-forms than in the case of the right diagram of FIG. 3. In this way, in the case of the left diagram of FIG. 3 the distance between the plastics material pre-forms is greater than in the case of the right diagram of FIG. 3. In this case, however, it is possible for the distance between the respective longitudinal directions of the plastics material pre-forms to remain the same and for the latter—if they have a larger cross-section—to be forced apart to a lesser degree than if they have a smaller cross-section. A toothed wheel 36 can be provided about which the belt-like carrier 2 circulates and which is pivotable with the arm 32.

Figure 4:
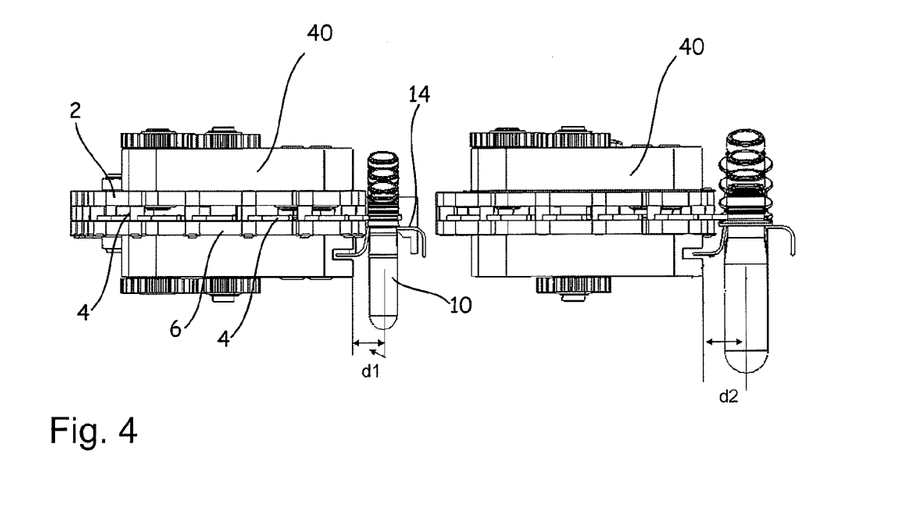
FIG. 4 are side views of the apparatus shown in FIG. 3.

FIG. 4 is a side view of the apparatus shown in FIG. 3. The distance d1 in the left diagram of FIG. 4 is smaller than the distance d2 in the right diagram of FIG. 4. Here, the left diagram of FIG. 4 (i.e. in the case of the plastics material pre-forms with the smaller cross-section) the engagement devices 4 are fed further to the plastics material pre-forms 10 than in the case of the right diagram of FIG. 4.

In this manner, it is possible, during a flow of plastics material pre-forms 10, for a specific division to be achieved in each case in a manner independent of their diameter. In other words, a flow of plastics material pre-forms 10 which have a specific diameter can be set to the same distribution as a flow of plastics material pre-forms 10 with a diameter larger than the latter.

Figure 5:
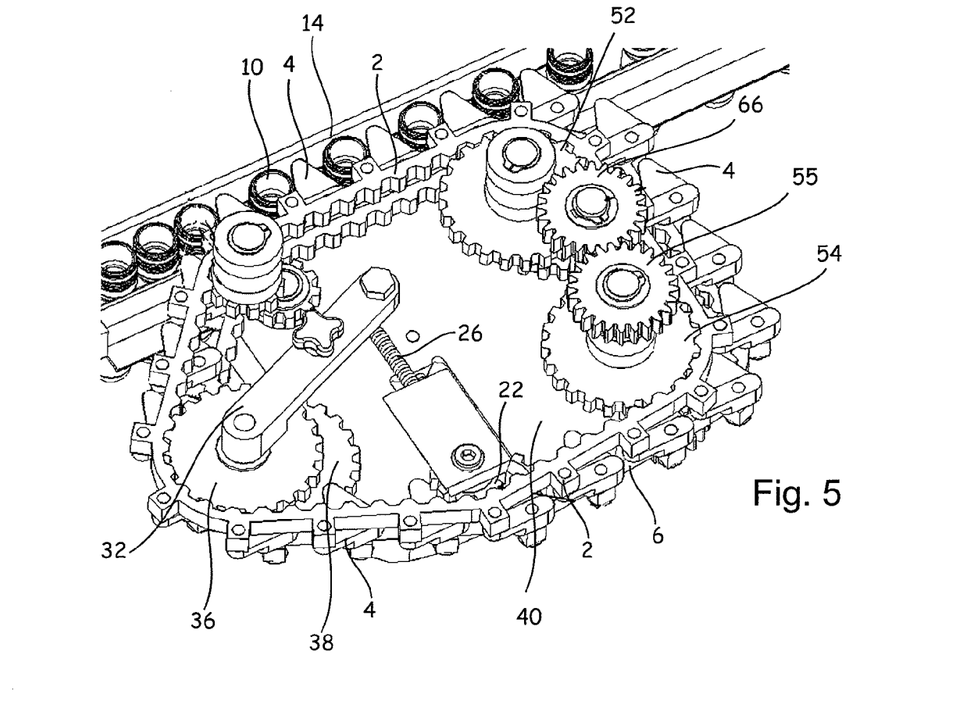
FIG. 5 is a further detailed view of the apparatus according to some embodiments of the inventive concepts.

FIG. 5 shows the internal structure of an apparatus according to the invention. The engagement devices 4 or catches, respectively, can move without obstruction between two toothed belts 2 and 6, i.e., the two circulating carriers. However, as shown in greater detail below, they are always held in the same position by an offset belt guide.

In other words, the engagement devices are articulated both on the first carrier 2 and on the second carrier 6, which are both in the form of circulating toothed belts, and they can move in each case with respect to the pivot axes which are at a right angle to the circulation plane of the belts 2, 6. By means of a suitable arrangement of these two toothed belts 2, 6 it is made possible for the engagement devices 4 to be deflected in a precisely defined manner and in this way to allocate them in particular during the portion of the feed towards the plastics material pre-forms 4 and also during the conveying of the plastics material pre-forms 4 towards the latter. A reversal in position of the engagement devices 4 in this way is achieved for example by a mutual offsetting of the two carriers 2 and 6, as shown for example, by the arrangement of the two toothed wheels 36 and 38 which are arranged eccentrically in this case.

Although these two toothed wheels 36, 38 preferably have the same diameter, they are offset with respect to each other, as shown in FIG. 5. On account of this defined offsetting the two toothed belts 36, 38 are also offset with respect to each other in such a way that the engagement devices 4 articulated to the two toothed belts 2, 6 are pivoted with respect to the carriers or the belts respectively.

In other words, the two carriers 2 and 6 do not extend in a completely similar manner with respect to each other in this case, but the directions of the respective carriers are shifted in part towards each other. In this way, the lower carrier 6 is guided for example in part inside the upper carrier 2 or the first carrier respectively. As a result of a shift of one carrier 2 in this way with respect to the other carrier 6 in the plane of movement, a corresponding pivoting of the engagement devices is also achieved, since the first pivot axis of the engagement devices, by means of which the engagement devices 4 is arranged on the first carrier, is shifted with respect to the second pivot axis, by means of which the engagement devices 4 is arranged on the second carrier.

Figure 6:
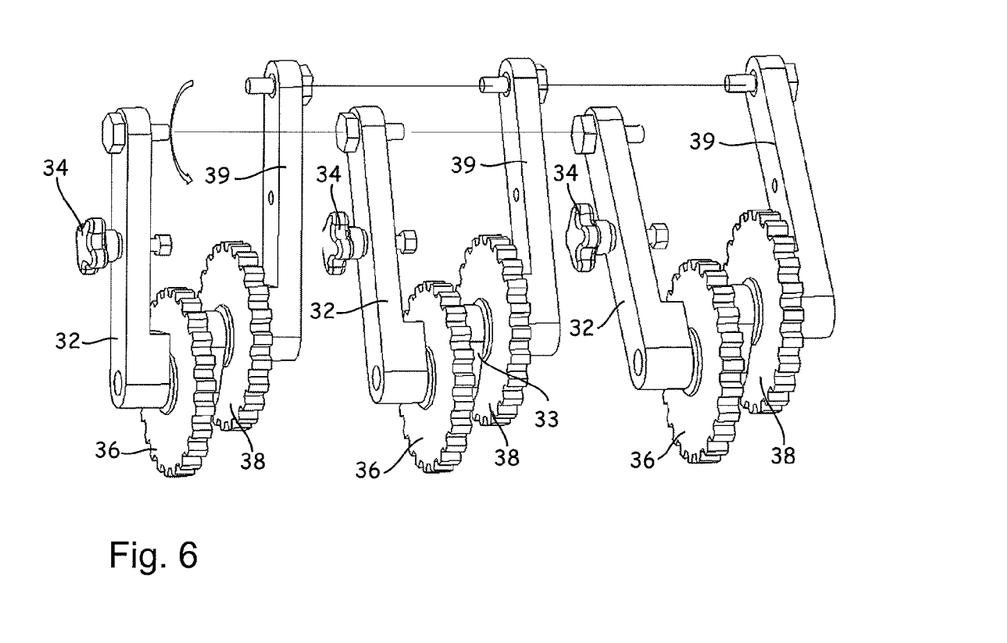
FIG. 6 is an illustration of a region of a pivot arm, according to some embodiments of the inventive concepts.

FIG. 6 is an illustration of a region of a pivot arm 32, according to some embodiments of the inventive concepts. Two toothed wheels 36 and 38 around which the carriers 2 and 6 (not shown) are guided are pivotable in their entirety with respect to one pivot axis in each case. A lower arm 39 is likewise pivoted with respect to a pre-set pivot axis. In this case the pivot axis of the arm 32 is offset with respect to the pivot axis of the arm 39. In this way, the relative position of the two toothed wheels 36 and 38 with respect to each other is also altered slightly by a corresponding pivoting. Therefore, the relative position of the two carriers 2 and 6 may also be altered with respect to each other.

A link connection 33 permits the two toothed wheels 36 and 38 to be coupled to each other. In a further advantageous embodiment, the two toothed wheels 36 and 38, or the respective axes of rotation thereof respectively, are therefore also connected to each other in an articulated manner. This means that, although a distance between the two axes of rotation of the toothed wheels 36 and 38 does not change, the relative position of the two toothed wheels 36, 38 with respect to each other can change.

In this way, it is preferable for the apparatus according to the invention to have at least one reversing wheel about which a carrier is guided. The reversing wheel is arranged so as to be pivotable with respect to a main carrier on which further wheels are preferably arranged for guiding the carriers.

A pre-tensioning device 26 forces the above-mentioned tensioning wheel 22 outwards and thus tensions the two carriers 2 and 6. The two carriers 2, 6 can be in engagement with this tensioning wheel 22, but it would also be possible for two tensioning wheels of this type to be provided, about which the two carriers 2 and 6 are guided in each case.

The other toothed wheels 52 and 54, which are used for the drive of the carriers 2 and 6, can be coupled to each other by way of toothed wheels 55 and 66. In this way, it is possible for a drive to be provided which drives only one of these aforesaid toothed wheels and thus also drives the two belt-like carriers 2 and 6.

Figure 7:
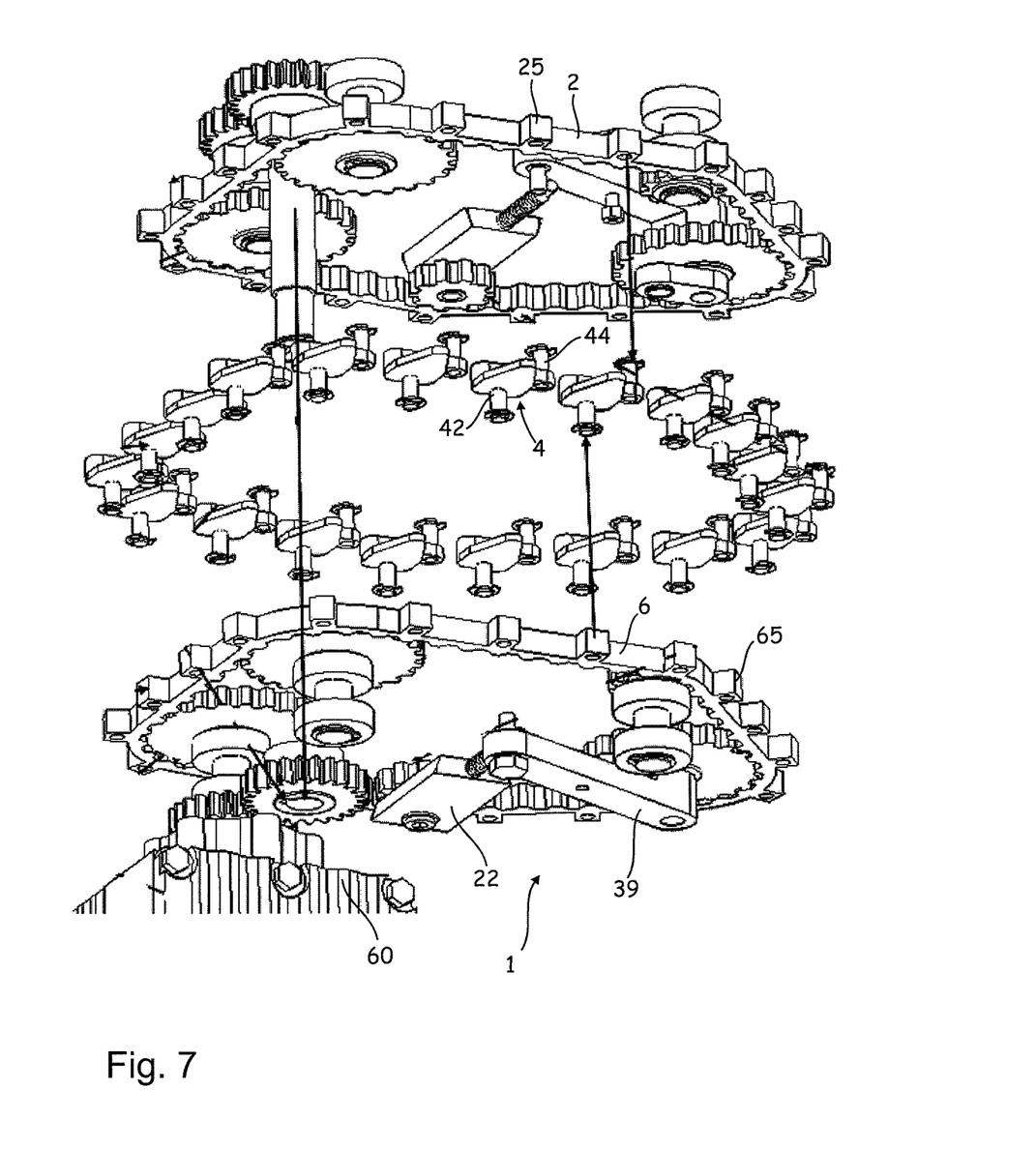
FIG. 7 is an exploded view of an apparatus according to embodiments of the inventive concepts.

FIG. 7 is an exploded view of an apparatus 1 according to embodiments of the inventive concepts. Two belt-like carriers 2 and 6 are again shown, to which the engagement devices 4 can articulate. Here, two pivot shafts 42 and 44 which can be formed as one piece with the engagement devices 4. The pivot shaft 44 can be articulated to the first carrier 2, and the pivot shaft 42 to the second carrier 6. In this way, by means of a relative movement of these two carriers with respect to each other, a pivoting of the engagement devices 4 can be achieved. An articulation device 25 is arranged on the carrier 2 and on which the pivot shafts of the engagement devices 4 are arranged. An articulation device 65 of the second carrier 6 can be arranged in a similar manner.

A drive 60 which drives the toothed wheels and thus also the carriers 2 and 6 can be provided. The toothed wheels can be situated one directly over the other in this case to be driven at the same time by the drive device by way of a common drive shaft. It is thus preferable for the two carriers 2, 6 to circulate at the same speed of circulation. In addition, it is preferable for the two carriers 2, 6 also to be tensioned in each case with sprung tensioning rollers. Furthermore, a transfer shaft drive can also be present which transmits the movement of the lower carrier or the toothed wheels driving it respectively to the respective upper toothed wheels. It is preferable for the engagement devices 4 to be separated from one another and to be held in a specific position with respect to one another only by way of the two carriers 2 and 6. The engagement devices 4 can be constructed in a similar manner in each case. These can be plastics material elements which can be coated in such a way that they can slide easily or with little friction respectively between the respective plastics material containers.

The Applicants reserve the right to claim all the features disclosed in the application documents as being essential to the invention, insofar as they are novel either individually or in combination as compared with the prior art.

What is claimed is:

1. An apparatus that conveys container pre-forms, comprising:
   a first circulating carrier; and
   a plurality of engagement devices constructed and arranged on the first circulating carrier, such that the engagement devices circulate along a pre-set circulation path during a movement of the first circulating carrier, wherein the circulation path has at least one portion at which the engagement devices are fed during the movement along the circulation path onto a flow of the container pre-forms, wherein the engagement devices are positioned between each of the pre-forms, and wherein the engagement devices are shaped such that during the feed onto the flow of the container pre-forms each engagement device applies a force between two adjacent container pre-forms and forces the two container pre-forms apart from each other, wherein a geometrical position of at least one portion of the circulation path of the engagement devices is adjustable, wherein a depth of penetration of the engagement devices into the flow of the container pre-forms is adjustable for setting a desired division between the adjacent container pre-forms.

2. The apparatus according to claim 1, wherein the circulation path has at least two portions, each portion having a different curvature.

3. An apparatus according to claim 1, wherein the first circulating carrier is a circulating carrier having at least a flexible portion.

4. An apparatus according to claim 1, wherein the engagement devices are constructed and arranged to pivot with respect to the first circulating carrier.

5. An apparatus according to claim 1, wherein a geometrical position of at least one portion of the circulation path of the engagement devices changes with respect to the flow of the container pre-forms.

6. The apparatus according to claim 1, wherein the circulation path has at least one straight portion.

7. The apparatus according to claim 1, further comprising a feed rail which supports the container pre-forms, wherein the container pre-forms are conveyed along the feed rail.

8. The apparatus according to claim 1, wherein at least one engagement device has a shape having a shape that increases in a direction of extension.

9. The apparatus according to claim 1, wherein the apparatus has a second circulating carrier, wherein a circulation plane of the second carrier is parallel to a circulation plane of the first carrier.

10. The apparatus according to claim 9, wherein the engagement devices are arranged on the second circulating carrier.

11. The apparatus according to claim 1, wherein the container pre-forms include plastics material pre-forms.

12. A method of conveying material container preforms, comprising:
    conveying the material container preforms in a continuous flow;
    separating the material container preforms from each other by a separating device; and
    arranging a plurality of engagement devices on a circulating carrier and feeding the engagement devices to the continuous flow of the material container preforms to separate the material container pre-forms, including:
      inserting an engagement device of the plurality of engagement devices between adjacent material container pre-forms and forcing the adjacent material container pre-forms apart, wherein the engagement devices are positioned between each of the pre-forms, wherein a geometrical position of at least one portion of a circulation path of the engagement devices is adjustable, wherein a depth of penetration of the engagement devices into the flow of the container pre-forms is adjustable for setting a desired division between the adjacent container pre-forms.

13. The method according to claim 12, wherein the material container preforms are conveyed on a straight conveying path for a predetermined time during the separation of the material container pre-forms.

14. The method according to claim 12, wherein the material container pre-forms include plastics material pre-forms.

15. The method according to claim 12, wherein the engagement devices circulate along a pre-set circulation path during a movement of the circulating carrier.

16. The method according to claim 12, further comprising: conveying the container pre-forms along a feed rail.

17. The method according to claim 12, wherein the engagement devices have a triangular or trapezoidal shape for insertion between adjacent container pre-forms.

18. An apparatus that conveys container pre-forms, comprising:
    a carrier; and
    a plurality of engagement devices constructed and arranged on the carrier, which conveys the engagement devices are conveyed along a path, wherein the engagement devices inserted between the pre-forms for separating the pre-forms, wherein the engagement devices are positioned between each of the pre-form, wherein a geometrical position of at least one portion of the path of the engagement devices is adjustable, wherein a depth of penetration of the engagement devices into the flow of the container pre-forms is adjustable for setting a desired division between the adjacent container pre-forms.

19. The apparatus according to claim 18, wherein a geometrical position of at least one portion of the path of the engagement devices with respect to the flow of the containers is adjustable.

20. The apparatus according to claim 18, wherein the path is a circulation path having at least one straight portion.

21. An apparatus that conveys container pre-forms, comprising:

a first circulating carrier; and a plurality of engagement devices constructed and arranged on the first circulating carrier, such that the engagement devices circulate along a pre-set circulation path during a movement of the first circulating carrier, wherein the circulation path has at least one portion at which the engagement devices are fed during the movement along the circulation path onto a flow of the container pre-forms, and wherein the engagement devices are shaped such that during the feed onto the flow of the container pre-forms each engagement device applies a force between two adjacent container pre-forms and forces the two container pre-forms apart from each other, wherein the circulation path has at least two portions, each portion having a different curvature, wherein a geometrical position of at least one portion of a circulation path of the engagement devices is adjustable, wherein a depth of penetration of the engagement devices into the flow of the container pre-forms is adjustable for setting a desired division between the adjacent container pre-forms.

22. The apparatus according to claim 1, wherein the pre-forms have sidewalls, and wherein the engagement devices directly contact an outer surface of the sidewalls of the pre-forms.

* * * * *